Jan. 9, 1934.   C. A. DE GIERS   1,943,267
REMOTE TEMPERATURE INDICATOR
Original Filed Oct. 1, 1930
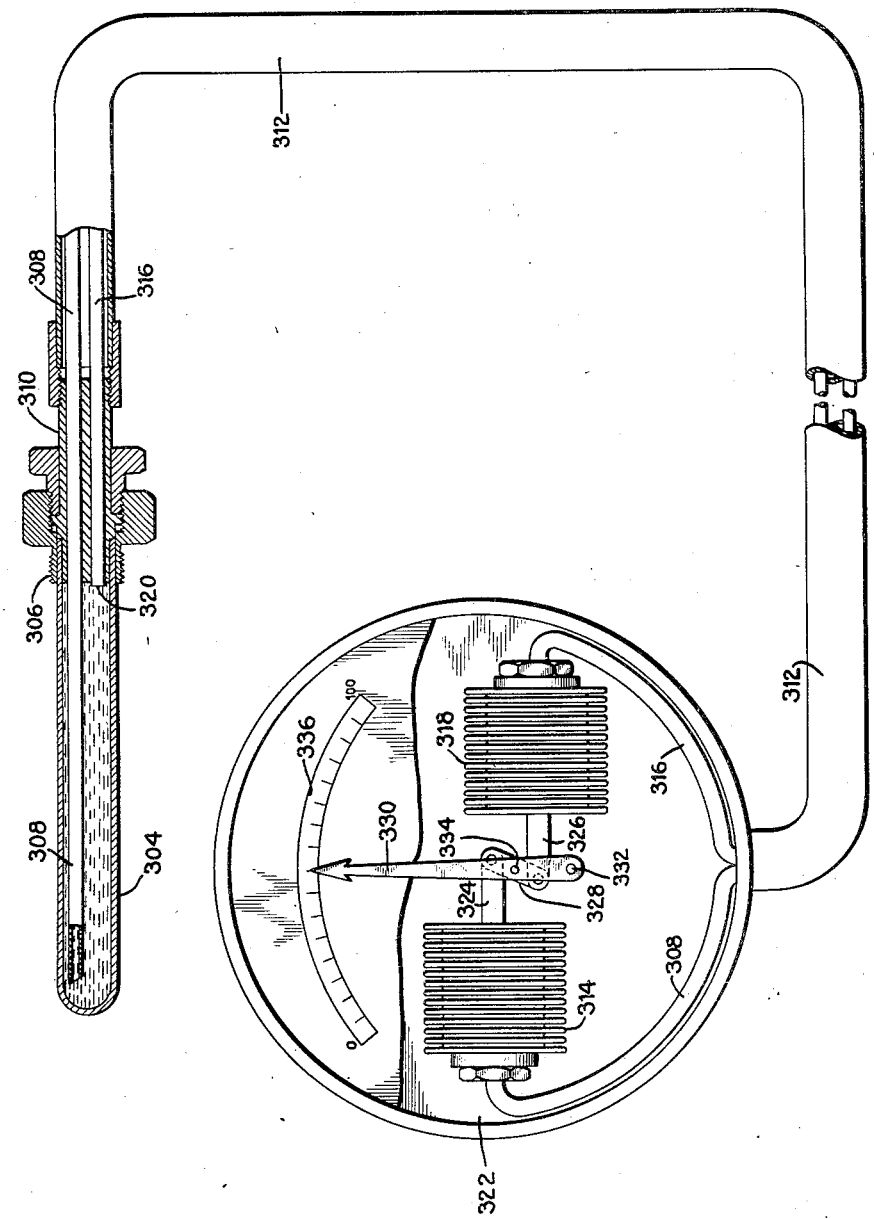
INVENTOR
Clarence A. de Giers
BY
Cooper, Kerr & Dunham
ATTORNEY Patented Jan. 9, 1934

1,943,267

UNITED STATES PATENT OFFICE 1,943,267

REMOTE TEMPERATURE INDICATOR

Clarence A. de Giers, Forest Hills, N. Y., assignor, by mesne assignments, to Richard C. Murphy, New York, N. Y.

Original application October 1, 1930, Serial No. 485,808. Divided and this application April 27, 1932. Serial No. 607,683

1 Claim. (Cl. 73—52)

This invention pertains to remote control devices of the hydraulic type, particularly a modification adapted for use as a thermometer giving an indication of temperature on a dial. This application is a division of my application Serial No. 485,808, filed October 1, 1930, for remote control apparatus and for which a Patent No. 1,881,266 issued October 4, 1932.

The drawing shows a thermometer with remote indicator and temperature compensator, the indicator being a pointer moving over a fan shaped chart.

A bulb 304 is provided with a screw thread 306 adapting it to be screwed into a boiler or other vessel in which it is desired to take temperature observations. A tube 308 extends from the inner end of the bulb through a fitting 310 and conduit 312 to the fixed end of sylphon 314. A tube 316 runs from the fixed end of sylphon 318 through conduit 312 and fitting 310 to terminate at the end thereof with a sealed end 320. The sylphons, tubes, and bulb are filled with liquid, and the sylphons are mounted on the gauge frame 322 on parallel offset axes, with their outer ends fixed but with their inner ends pivotally connected by rods 324 and 326 to opposite ends of link 328. A pointer 330 fulcrumed at 332 is pivotally connected by pin 334 to the middle of link 328. The upper end of the pointer passes over a temperature indicating chart 336.

In operation, when a change of temperature occurs in bulb 304 the liquid therein will expand or contract and some of it will be forced into or out of tube 308, thereby causing sylphon 314 to expand or contract axially, thereby swinging pointer 330 about its fulcrum 332 through the instrumentality of link 328 the lower pivot of which is stationary.

The above described apparatus will give correct results while the gauge, conduit, and transmission tubes remain at a fixed temperature, but will give incorrect results if said temperature varies. In order to insure correct indications under changeable temperatures, tube 316 and sylphon 318 are provided. Tubes 308 and 316 being similar and of the same length outside of bulb 304, and sylphons 314 and 318 being similar, any change of atmospheric temperature will affect tube 308 and its sylphon 314 exactly as tube 316 and its sylphon 318 are affected; consequently sylphons 314 and 318, under such conditions, will expand or contract similar amounts axially, thus rotating link 328 idly about its central pivot 334, without moving pointer 330. A change of temperature within bulb 304, however, will move pointer 330, and the combination of devices will give correct indications of temperature within the bulb, regardless of changes of temperature without the bulb.

It is to be understood that the invention is not limited to the specific embodiment herein illustrated and described, but may be used in other ways without departure from its spirit as defined by the following claim.

Apparatus for indicating temperature at a remote point, comprising in combination, a bulb adapted to be exposed to change of temperature, an indicator remote from said bulb, and a pair of sylphons operatively connected to said indicator, one of said sylphons being connected by a tube to the interior of said bulb, the other sylphon having a similar tube leading to said bulb but closed at its end adjacent the bulb, said first sylphon being effective to move said indicator in response to change of temperature of said bulb, and said second sylphon being effective to compensate for change of temperature of parts of the apparatus between said bulb and said indicator, said indicator including a pointer, and the means for operatively connecting said sylphons to said indicator including a link fulcrumed on said pointer and means for pivotally connecting each of said sylphons to an opposite end of said link, substantially as described.

CLARENCE A. DE GIERS.